United States Patent [19]

Goss

[11] Patent Number: 5,101,771

[45] Date of Patent: Apr. 7, 1992

[54] ANIMAL LITTER WITH BIODEGRADABLE CLUMPING AGENT

[75] Inventor: G. Robert Goss, Quincy, Ill.

[73] Assignee: Oil-Dri Corporation of America, Chicago, Ill.

[21] Appl. No.: 726,324

[22] Filed: Jul. 5, 1991

[51] Int. Cl.⁵ .............................................. A01K 1/015
[52] U.S. Cl. ................................................... 119/173
[58] Field of Search ........................ 119/171, 172, 173

[56] References Cited

U.S. PATENT DOCUMENTS

| | | | |
|---|---|---|---|
| 4,315,761 | 2/1982 | Larrson et al. | 119/171 |
| 4,591,581 | 5/1986 | Crampton et al. | 119/173 |
| 4,685,420 | 8/1987 | Stuart | 119/173 |
| 5,000,115 | 3/1991 | Hughes | 119/173 |
| 5,014,650 | 5/1991 | Sowle et al. | 119/171 |

FOREIGN PATENT DOCUMENTS 0239932  10/1987  Japan ................................ 119/173

*Primary Examiner*—Robert P. Swiatek
*Assistant Examiner*—Todd E. Manahan
*Attorney, Agent, or Firm*—Dressler, Goldsmith, Shore, Sutker & Milnamow, Ltd.

[57] ABSTRACT

The animal litter that forms clumps upon wetting by the animal is constituted by particulate non-swelling clay and an organic clumping agent distributed over individual clay particles in an oleaginous vehicle such as mineral oil. A preferred organic clumping agent is a cellulose ether, e.g., hydroxypropylmethylcellulose.

17 Claims, 1 Drawing Sheet

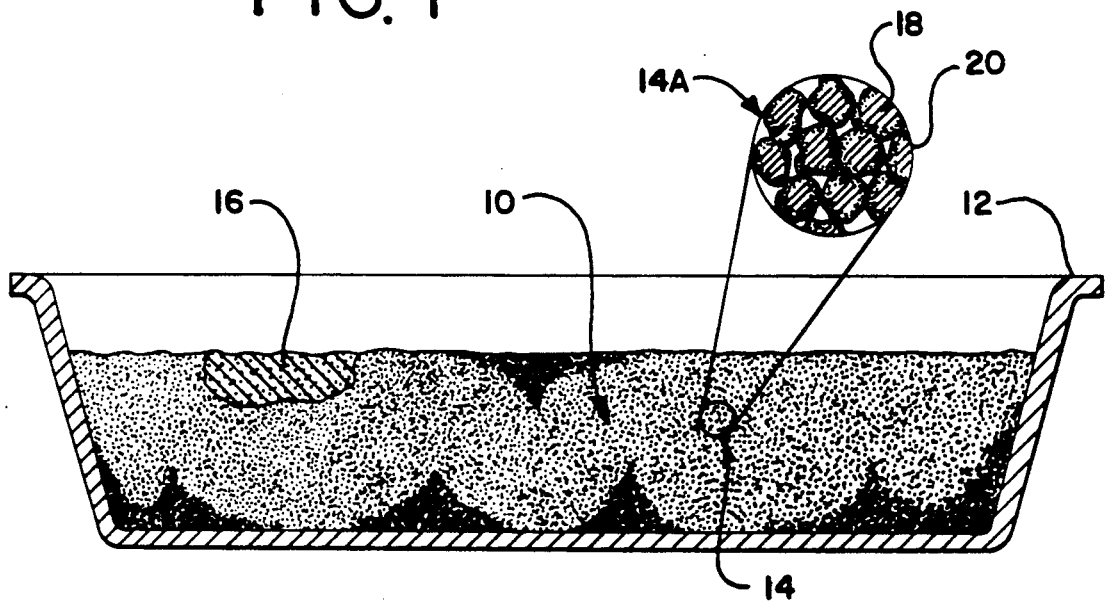

ANIMAL LITTER WITH BIODEGRADABLE CLUMPING AGENT

TECHNICAL FIELD

This invention relates to animal litter compositions and to methods for manufacturing such compositions.

BACKGROUND OF THE INVENTION

Clay particles have long been used for providing small animals with dry, sanitary, dustless and relatively odorless litter and bedding. For example, U.S. Pat. No. 2,649,759 to Gibbs describes the use of porous calcined clay as a litter for poultry and small animals.

Similarly, swelling clays have long been recognized as one means of facilitating separation and removal of urine-soaked clay particles from an otherwise fresh bed of animal litter. Such clays expand in volume and become tacky when wetted, forming clumps of spent clay which can be individually removed from the bed. U.S. Pat. No. 5,000,115 to Hughes describes a method and a composition of absorbing animal dross using a swellable clay.

The swelling clay, upon contact with water, typically expands to ten or more times its original dry volume. If not completely loaded with animal urine at the time of disposal, the swelling clay will continue to expand when contacted with additional liquids as, for example, within a household plumbing system. During a period of continued swelling, the swelling clay has a propensity for becoming lodged within any recess, nook, or cranny, where it may otherwise have only temporarily come to rest.

This shortcoming of the swelling clay is compounded by a tacky surface texture which often accompanies the swelling of the clay. Further, because the swelling clay is an inorganic material that is not subject to biodegradation, a deposit of the swelling clay once lodged will tend to persist and accumulate more deposits Over a period of time, the household plumbing system in which they are lodged may become blocked.

At least partly to avoid the plumbing blockages associated with the swelling clays, clumping agents have been devised which, when added to a bed containing non-swelling clay particles, cause the particles to clump together into an agglomeration of sufficient size and strength be removed by a sieving spoon. U.S. Pat. No. 4,638,763 to Greenberg describes a litter composition utilizing anhydrous sodium sulfate as a clumping agent. On contact with liquid water, the sodium sulfate presumably dissolves to form an aqueous solution which can be removed from household waste water, if at all, only by sophisticated tertiary water treating equipment. The United States Government currently sets limits on the concentration and amount of sulfates which municipalities may discharge from their treatment facilities. A need exists for a biodegradable clumping agent capable of acting upon particles of non-swelling clay.

U.S. Pat. No. 4,591,581 to Crampton et al. recommends polysaccharides, such as carboxymethyl cellulose, hydroxypropyl cellulose, and soluble gums which hydrate in water, as ingredients intimately admixed with clay fines for increasing the absorbency of a pressure-compacted clay mineral particle suitable for use as cat litter. Polysaccharides are generally biodegradable. However, since these polysaccharide additives must be distributed throughout the pressure compacted clay particles, it is unlikely that the additives would be present in sufficient concentration on the surface of the mineral clay particles to produce clumping when contacted by excreted animal body fluids U.S. Pat. No. 5,014,650 to Sowle et al. describes animal litter which is a dry blend of a porous, inert solid substrate, such as particulate clay, and a dry, particulate cellulosic ether. U.S. Pat. No. 4,685,420 to Stuart describes a similar animal litter that utilizes dry blends of clay with a particulate water-absorbent polymer. When excreted animal body fluids contact such litter, gelled agglomerates, or clumps, are produced.

While the foregoing type of clumping animal litter avoids the aforementioned shortcomings of the animal litters derived from swelling clays such as sodium bentonite, the animal litter nevertheless is dusty during manufacture, as well as dispensing. In addition, in such animal litter, the dry particulate cellulosic ether or the water-absorbent polymer tend to segregate from the particulate clay during handling and shipping.

What is needed is a relatively dust-free clumping animal litter that can be periodically disposed through a household plumbing system without fouling the system or creating an environmental nuisance. The clumping agent should not be so sensitive as to be triggered by water vapor which is always present in the atmosphere, and should not separate from the particulate clay during handling, yet should respond relatively quickly upon contact with excreted body fluids. A desirable clumping agent forms clumps strong enough for separation and disposal within a few minutes after formation. Ideally, the clumps hold together and remain durable for a period of at least a day or two, rather than weaken or disintegrate over time.

Animals may ingest some of the animal litter while grooming. Therefore, it is important that all of the components of the animal litter be safe for animal consumption. This is especially true for animal litter which will be used by household pets and may occasionally be spilled or tracked about a floor of a home.

SUMMARY OF THE INVENTION

The present invention provides a composition and a method of manufacture for a clumping animal litter which relatively quickly forms agglomerates upon contact with relatively small amounts of an aqueous liquid, such as water or body fluids, yet rapidly disperses upon disposal to produce only non-swelling clay particles and biodegradable end products The clumping animal litter contemplated by the present invention comprises discrete, free-flowing and non-swelling clay particles and a water-soluble organic resin clumping agent in an oleaginous vehicle, such as mineral oil, distributed on the surface of the free flowing clay particles.

BRIEF DESCRIPTION OF THE DRAWING

In the drawing, FIG. 1 is a sectional elevation showing a litter bed of clumping animal litter that embodies this invention and is contained in a litter box.

DESCRIPTION OF THE PREFERRED EMBODIMENTS

A clumping animal litter of this invention includes free-flowing particulates of clay that are substantially non-swelling together with an organic clumping agent that is biodegradable, suspended in an oleaginous vehicle such as mineral oil, and distributed over the surface of the free-flowing clay particles. The present invention is eminently well suited for the containment of aqueous body fluids excreted or spilled by small animals. Such liquids include any aqueous liquid which may be excreted or regurgitated by the animal, as well as spilled foodstuffs or blood. The present invention is useful as litter for household cats, but the scope of the invention itself is not so limited.

The non-swelling clay is an earthy material composed primarily of hydrous aluminum silicates and is to be distinguished from the so-called swelling clays that are capable of absorbing several times their height of an aqueous liquid. Relatively small amounts of non-clay materials can also be present. The non-swelling clay is usually derived from a naturally occurring raw material, but synthetic non-swelling clays are also suitable. A clay which is particularly useful in practicing the present invention is a non-swelling smectite, i.e., a clay composed of units constituted by two silica tetrahedral sheets with a central alumina octahedral sheet. See, for example, Grim, *Clay Mineralogy*, 2nd ed., McGraw-Hill, Inc., New York, N.Y. (1968), pp. 77–78. Smectite-attapulgite mixtures can also be used for this purpose.

It is common for individual clay particles to change in volume to some extent when absorbing an aqueous liquid. Typically, the "non-swelling" clays only expand so that a fully hydrated clay particle occupies less than about 150% of the volume that the particle occupied in an anhydrous state. In contrast, the swelling clays are capable of expanding more than 500% hydration. An example of a well known swelling clay is sodium bentonite, also called Wyoming bentonite. That particular swelling clay is commonly utilized as an oil-well drilling mud because of its propensity to swell and absorb large volumes of water. In a hydrated state, swelling clays often exhibit a tackiness which will cause adjacent particles of the swelling clay to agglomerate.

The non-swelling clay utilized in the litter compositions of the present invention expands minimally while travelling along a plumbing system for disposal, thus plugging of the plumbing system is not likely. Further, non-swelling clays do not ordinarily exhibit the tackiness associated with hydrated swelling clays, and so are less likely to agglomerate into large masses capable of adversely affecting the functioning of the plumbing system.

Smectites are particularly well suited as the particulate non-swelling clay constituent for the present purposes. These clays can range in color from a cream or grey off-white to a dark reddish tan color. Such smectites are frequently referred to in the trade under designations such as Mississippi Grey, Mississippi Tan and Georgia White. These clays contain calcium and/or magnesium in the form of exchangeable cations.

The clay constituent of the present compositions is in the form of discrete particles. These particles preferably are rounded in shape to facilitate bagging and handling, and have surfaces that are reasonably smooth to the touch so that an animal feels comfortable standing upon them. Although particle sizes up to about 1 inch are suitable, a preferred size of clay particles is in the range of about 4 by about 60 mesh, U.S. Sieve Series. An especially preferred size range for the clay particles is the range of about 20 to about 60 mesh.

Within the preferred particle size ranges, the clay particle size can be manipulated as a means of modulating the contours of the clump that is produced upon contact with an aqueous liquid. Relatively flatter, thinner clumps are more easily located by probing the animal litter with, for example, a sieving spoon than are spheroidal clumps of similar volume. On the other hand, thinner clumps are more subject to breakage. The particle size distribution of the clay particles may therefore be tailored to a preference held by a particular group of consumers. For relatively thinner, flatter clumps, a particle size of about 20 mesh by 60 mesh, U.S. Sieve Series, is preferred. On the other hand, for relatively heavier, spheroidal clumps, a relatively coarser particle size in the range of about 4 by 20 mesh, U.S. Sieve Series, is preferred.

The clumping agent is an organic gelling agent that is dispersed in mineral oil and distributed over the surface of the individual clay particles. The clumping agent is a water-soluble organic resin, such as a cellulosic ether, which forms a gel upon contact with the excreted body fluid. However, this organic resin is not so water-sensitive as to be triggered into clumping by contact with atmospheric water vapor. The mineral oil that is present on the clay particles in a relatively small amount not only serves a vehicle for the distribution of the clumping agent without substantial dusting, but also aids in minimizing the likelihood of premature clumping under humid conditions. However, upon contact with an appropriate amount of an aqueous liquid, adjacent clay particles bind to one another to form a clump within a matter of minutes. The formed clump is sufficiently durable for mechanical separation and removal from a bed of otherwise substantially dry animal litter. The formed clump preferably remains intact and durable for at least a day in order to provide the animal's owner with an opportunity to remove and dispose of the clump.

A preferred organic clumping agent is a water-soluble, oil-dispersable resin, such as a cellulose ether. The cellulose ether can be methyl cellulose, carboxymethyl cellulose, hydroxypropylmethylcellulose, mixtures thereof, and the like. Of these, hydroxypropylmethylcellulose is preferred. Examples of cellulose ethers that may be used as the clumping agent in the present invention are the cellulose ether products manufactured by the Dow Chemical Company of Midland, Mich., U.S.A., and commercially available under the designation METHOCEL. Xanthan gum is yet another example of a suitable clumping agent which can be used alone or in combination with a cellulose ether.

Methyl cellulose can be obtained by reacting wood or cotton cellulose fibers with methyl chloride in the presence of caustic soda. Hydroxypropylmethylcellulose can be produced by reacting methyl chloride and propylene oxide with cellulose fibers in the presence of caustic soda. Both methyl cellulose and hydroxypropylmethylcellulose are recognized by the U.S. Food and Drug Administration (FDA) as being acceptable food additives for human foodstuffs. Both readily dispersed in mineral oil, especially when dispersed as fine particles.

When cellulose ethers, such as methyl cellulose and hydroxypropylmethylcellulose, are present in very low concentrations in an aqueous solution, e.g., less than about 0.1% by weight, they increase the viscosity of the aqueous solution by only a relatively small amount. Cellulose ethers in such low concentrations also exhibit surfactant properties which tend to keep any particulate matter present in the solution in suspension. As the concentration of the cellulose ether in an aqueous solution is increased, usually in the range of about 0.25% to about 2% by weight, the viscosity of the solution increases dramatically. The cellulose ethers then serve to bind adjacent particles into an agglomerate Finally, if the concentration of the cellulose ether is increased further, as by drying, the cellulose ether, exhibits adhesive properties. The cellulose ethers remain water-soluble throughout The process of agglomeration and adhesive can be reversed at any stage by the addition of a sufficient amount of water.

As mentioned hereinabove, xanthan gum is also suitable for use as a clumping agent in practicing the instant invention. The xanthan gum molecule contains a $\beta$—(1→4)-linked D-glucopyranosyl backbone chain, as the cellulose molecule does. To the backbone chain are appended trisaccharides side chains composed of D-mannopyranosyl and D-glucopyranosyluronic acid residues Xanthan gum in water produces a solution with high viscosity at a relatively low concentration of gum. Such a xanthan gum solution exhibits pseudo-plasticity, i.e., the viscosity decreases as shear rate increases. The FDA has approved xanthan gum for use as a food additive.

The biodegradable organic clumping agent is distributed over the surface of the individual clay particles in a mineral oil as a preferred oleaginous liquid vehicle. In this manner, the mineral oil functions as a binder for the clumping agent and concurrently provides dust abatement as well. While the mineral oil penetrates into the surface layer of the individual clay particles, the penetration does not affect adversely the absorption and liquid retention capabilities of the clay particle core portion. The term "mineral oil," as used herein and in the appended claims, denotes a mixture of liquid hydrocarbons obtained from petroleum and having a specific gravity in the range of about 0.82 to about 0.95.

To facilitate the dispersion and subsequent clumping of the clay particles, preferably a moderately lipophilic, non-ionic emulsifier for the mineral oil is added as well. Such moderately lipophilic, non-ionic emulsifier has a hydrophile-lipophile balance (HLB) value of at least about 10, as determined by The Atlas HLB System, 2d Ed. (Revised), Atlas Chemical Industries, Inc., Wilmington, Del. (1963).

Suitable illustrative non-ionic emulsifiers are the ethoxylated alkyl phenols, such as polyoxyethylene(6) nonyl phenyl ether (HLB 10.8), polyoxyethylene(5) nonyl phenyl ether (HLB 10.0), polyoxyethylene(9) nonyl phenyl ether (HLB 13.0), and the like. Also suitable are the mixtures of oleate esters of sorbitol and sorbitol anhydrides condensed with ethylene oxide, such as polyoxyethylene(5) sorbitan monooleate (HLB 10.0), polyoxyethylene(20) sorbitan trioleate (HLB 11.0), polyoxyethylene(20) sorbitan monostearate (HLB 14.9), and the like. Mixtures of the foregoing and like emulsifiers can also be utilized for the present purposes.

Based on the weight of the mineral oil present, the non-ionic emulsifier can be present in an amount in the range of about 3 to about 8 weight percent, preferably about 5 to about 7 weight percent.

The clumping agent is combined with the oleaginous vehicle, such as mineral oil, in an amount in the range of about 15 to about 30 weight percent, based on the weight of the oil. Preferably, the amount of clumping agent present and dispersed in the mineral oil is in the range of about 20 to about 25 weight percent, based on the weight of the mineral oil.

To produce a clumping, yet relatively dust-free animal litter of the present invention, the clumping agent is first dispersed in the mineral oil, preferably with the non-ionic emulsifier present. The resulting dispersion is then distributed, e.g., by spraying, over the particulate non-swelling clay having the desired particle size range so as to provide a desired clumping agent concentration on the particulate clay as set forth hereinbelow.

Preferably, the cellulose ether bearing mineral oil is sprayed onto an agitated particulate clay bed until the desired cellulose ether loading on the clay particles has been achieved. If desired, the spraying can be done at an elevated temperature to enhance fluidity of the mineral oil.

The clumping agent is present in an amount in the range of about 0.25% to about 5% by weight, based upon the weight of the clay particles. It is preferred that the clumping agent be distributed on the clay particles in an amount in the range of about 0.5 weight percent to 2 weight percent, based on the weight of the clay The range of about 0.75 to about 1.5 weight percent is an especially preferred amount for the clumping agent. The mineral oil is present in the clay particles in an amount in the range of about 2 to about 20 weight percent, based on the weight of the clay, preferably in an amount in the range of about 5 to about 10 weight percent. The mineral oil is present on the clay particles in a surface layer thereof and contains therein the dispersed clumping agent along with the optional non-ionic emulsifier.

The non-ionic emulsifier is present in the clay particles in an amount in the range of about 0.2 to about 1.6 weight percent, based on the weight of the clay, preferably about 0.3 to about 0.6 weight percent. The weight ratio of mineral oil-to-emulsifier in the clay particles preferably is in the range of about 12 to about 18, more preferably about 14.

The relative amount of clumping agent present is important because it provides sufficient spatial distribution of the clumping agent over the clay particle surface, not only for the limited agglomerate formation but also for rapid and reliable dissolution of the clumping agent particles upon contact with a large excess of water, a condition usually present in a plumbing disposal system. Too high a concentration of the clumping agent, even in an excess of water, can lead to the formation of undesirable lumps which retard the dissolving process. Alternatively, if the amount of the clumping agent present is too low, the clump of clay will not form on contact with the excreted body fluid, or will be too weak structurally for separation and disposal.

Referring to FIG. 1, a bed 10 of particulate animal litter embodying the present invention is shown contained within litter box 12. A clump 16 is shown in a region of bed 10 where an animal has voided and thus caused an agglomeration of the particulate animal litter. A grouping of individual litter particles 14 is shown in section and enlarged at 14A. The grouping 14 is comprised of individual granules 18 having a surface layer 20 that includes mineral oil and a clumping agent dispersed therein, with or without a non-ionic emulsifier present.

The present invention is further illustrated by the following examples.

EXAMPLE 1

Preparation of a Cellulose Ether Dispersion in Mineral Oil

A liquid non-ionic emulsifier having an HLB value of about 10.8 (Igepal CO-530, polyoxyethylene(6) nonyl phenyl ether, about 5.9 grams) was combined with mineral oil (Medalist, about 91 grams). Thereafter, hydroxypropylmethylcellulose powder (F4M of Dow Chemical Co., about 10 grams) was stirred into the resulting admixture to produce a cellulose ether suspension of sprayable consistency. The relative amounts of the constituents in the suspension were as follows:

|  | Wt. % |
| --- | --- |
| Mineral oil | 77.8 |
| Emulsifier | 5.0 |
| Hydroxypropylmethylcellulose | 17.2 |
|  | 100.0 |

EXAMPLE 2

Preparation of Clumping Cat Litter

An aliquot of the mineral oil suspension of hydroxypropylmethylcellulose prepared in Example 1 (about 8 grams) was sprayed at ambient temperature onto clay particles (Oil-Dri RVM-GA, 24×48 mesh, about 100 grams) in an inclined, rotating container. After introduction of the entire aliquot of the suspension the container was rotated for an additional time period of about 15 minutes to assure substantially uniform distribution of the suspension over the clay particles present. The obtained particulate clay product had the following composition:

|  | Wt. % | Wt. %, Clay Basis |
| --- | --- | --- |
| Clay (Smectite, 24 × 48 mesh) | 92.6 | 100 |
| Mineral oil | 5.6 | 6 |
| Non-ionic emulsifier | 0.4 | 0.4 |
| Hydroxypropylmethylcellulose | 1.4 | 1.5 |
|  | 100.0 |  |

The thus produced particulate product was free flowing and was tested for clumpability. Very good clumps were produced upon contact with liquid. The produced clumps maintained their structure for a time period in excess of 48 hours. The same particulate clay but untreated did not produce acceptable clumps when contacted with same amounts of liquid.

The foregoing discussion and the accompanying examples are presented as illustrative, and are not to be taken as limiting. Still other variations within the spirit and scope of this invention are possible and will readily present themselves to those skilled in the art.

I claim:

1. A particulate, free flowing but clumpable animal litter composition which comprises discrete non-swelling clay particles having a water-soluble organic resin clumping agent dispersed in an oleaginous liquid vehicle on the surface of said clay particles.

2. The composition of claim 1 further characterized in that the organic water soluble resin is a cellulose ether.

3. The composition of claim 2 further characterized in that the cellulose ether is selected from the group consisting of methylcellulose, carboxymethyl cellulose, hydroxypropylmethylcellulose, and mixtures thereof.

4. The composition of claim 2 further characterized in that the cellulose ether is hydroxypropylmethylcellulose.

5. The composition of claim 1 further characterized in that the non-swelling clay is Smectite.

6. The composition of claim 1 further characterized in that the non-swelling clay particles have a particle size in the range of about 20 to about 60 mesh, U.S. Sieve Series.

7. The composition of claim 1 further characterized in that the oleaginous liquid vehicle is mineral oil, and a non-ionic emulsifier having an HLB value of at least about 10 is also present on the clay particles.

8. An animal litter composition which comprises:
   discrete non-swelling clay particles having a particle size that passes through a 4 mesh screen but is retained on a 60 mesh screen, U.S. Sieve Series;
   mineral oil, present in the clay particles in an amount in the range of about 2 to about 20 weight percent, based on the weight of clay;
   a non-ionic emulsifier having an HLB value of at least about 10 and present in the clay particles in an amount in the range of about 0.2 to about 1.6 weight percent, based on the weight of the clay; and
   a cellulose ether clumping agent dispersed in the mineral oil and present in the clay particles in an amount in the range of about 0.25 to about 5 weight percent, based on the weight of the clay.

9. The animal litter composition in accordance with claim 8 wherein
   the mineral oil is present in an amount in the range of about 5 to about 10 weight percent, based on the weight of the clay;
   the non-ionic emulsifier is present in an amount in the range of about 0.3 to about 0.6 weight percent, based on the weight of the clay; and
   the cellulose ether is present in an amount in the range of about 0.5 to about 2 weight percent, based on the weight of the clay.

10. The animal litter composition in accordance with claim 9 wherein the cellulose ether is hydroxypropylmethylcellulose and is present in an amount in the range of about 0.75 to about 1.5 weight percent, based on the weight of the clay.

11. A method for the preparation of free flowing particulate animal litter that clumps upon contact with an aqueous liquid which comprises the steps of:
    providing a suspension of a water-soluble resin clumping agent in an oleaginous vehicle; and
    distributing said suspension substantially uniformly over particulate, non-swelling clay.

12. The method in accordance with claim 11 wherein the distributing is effected by spraying.

13. The method in accordance with claim 11 wherein said clumping agent is a cellulose ether.

14. The method in accordance with claim 11 wherein said clumping agent is hydroxypropylmethylcellulose.

15. The method in accordance with claim 11 wherein said suspension includes a non-ionic emulsifier having an HLB value of at least about 10.

16. The method in accordance with claim 11 wherein said oleaginous vehicle is mineral oil.

17. The method in accordance with claim 11 wherein said non-swelling clay is smectite.

* * * * *